(12) United States Patent  
Chu

(10) Patent No.: US 12,260,222 B2  
(45) Date of Patent: Mar. 25, 2025

(54) EXCEPTION HANDLING METHOD AND RELATED APPARATUS

(71) Applicant: HUAWEI TECHNOLOGIES CO., LTD., Guangdong (CN)

(72) Inventor: Ning Chu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 2 days.

(21) Appl. No.: 18/455,612

(22) Filed: Aug. 24, 2023

(65) Prior Publication Data

US 2023/0401069 A1   Dec. 14, 2023

Related U.S. Application Data

(63) Continuation of application No. PCT/CN2022/077247, filed on Feb. 22, 2022.

(30) Foreign Application Priority Data

Feb. 25, 2021   (CN) .......................... 202110212148.1

(51) Int. Cl.
*G06F 9/44* (2018.01)
*G06F 9/30* (2018.01)
*G06F 9/38* (2018.01)

(52) U.S. Cl.
CPC ........ *G06F 9/3865* (2013.01); *G06F 9/30123* (2013.01); *G06F 9/38* (2013.01); *G06F 9/3854* (2023.08)

(58) Field of Classification Search
CPC .. G06F 9/3865; G06F 9/3854; G06F 9/30123; G06F 9/38
See application file for complete search history.

(56) References Cited

U.S. PATENT DOCUMENTS

| 4,970,641 | A | * | 11/1990 | Hester | ................... | G11C 29/88 710/260 |
| 5,237,700 | A | * | 8/1993 | Johnson | ................ | G06F 9/3863 712/216 |
| 5,628,016 | A | | 5/1997 | Kukol | | |
| 6,415,381 | B1 | * | 7/2002 | Bak | ....................... | G06F 9/4484 712/E9.082 |

(Continued)

FOREIGN PATENT DOCUMENTS

| CN | 1295600 | C | * | 1/2007 |
| CN | 100495324 | C | * | 6/2009 |

(Continued)

*Primary Examiner* — Cheng Yuan Tseng

(57) ABSTRACT

This application discloses an exception handling method, which may be applied to a processor. The method includes: The processor calls a second function according to a call instruction of a first function, where the first function is a high-level language function, and the second function is a runtime function. When an exception occurs in a process of executing the second function, the processor executes a return operation of the second function, where the return operation of the second function includes restoring a status of a first register used when the second function is executed to a status before the first function calls the second function. The processor performs exception handling based on the status of the first register. The method can improve running performance of the processor.

20 Claims, 8 Drawing Sheets

(56) References Cited

U.S. PATENT DOCUMENTS

| | | | | |
|---|---|---|---|---|
| 6,757,810 B1 * | 6/2004 | Takahashi | | G06F 9/3861 |
| | | | | 712/E9.032 |
| 7,310,723 B1 * | 12/2007 | Rozas | | G06F 9/30174 |
| | | | | 712/218 |
| 7,383,587 B2 * | 6/2008 | Watt | | G06F 9/45558 |
| | | | | 713/193 |
| 7,836,290 B2 * | 11/2010 | Chaudhry | | G06F 9/3863 |
| | | | | 712/242 |
| 7,900,207 B2 * | 3/2011 | Nemirovsky | | G06F 9/4818 |
| | | | | 718/107 |
| 8,166,338 B2 * | 4/2012 | Huth | | G06F 11/0793 |
| | | | | 714/5.11 |
| 8,448,022 B1 | 5/2013 | Scott | | |
| 8,689,215 B2 * | 4/2014 | Hankins | | G06F 9/3851 |
| | | | | 718/100 |
| 9,202,071 B2 * | 12/2015 | Grocutt | | G06F 21/52 |
| 10,795,800 B2 * | 10/2020 | Bain | | G06F 11/0706 |
| 10,838,877 B2 * | 11/2020 | Parker | | G06F 12/1425 |
| 11,461,104 B2 * | 10/2022 | Williams | | G06F 9/3861 |
| 2003/0023905 A1 | 1/2003 | Boling | | |
| 2003/0037227 A1 * | 2/2003 | Nomura | | G06F 9/3861 |
| | | | | 712/E9.06 |
| 2023/0205869 A1 * | 6/2023 | Constable | | G06F 9/30105 |
| | | | | 726/26 |
| 2023/0401069 A1 * | 12/2023 | Chu | | G06F 9/3865 |

FOREIGN PATENT DOCUMENTS

| | | | | | |
|---|---|---|---|---|---|
| CN | 109933451 | A | * | 6/2019 | |
| CN | 110275792 | A | * | 9/2019 | G06F 11/0793 |
| CN | 111222103 | B | * | 3/2022 | G06F 21/12 |
| JP | 4423757 | B2 | * | 3/2010 | |
| JP | 2017208058 | A | * | 11/2017 | |

* cited by examiner

| Exception (ns) | Total time required for the exception (before optimization) | Total time required for the exception (after optimization) |
|---|---|---|
| First test | 214584 | 128125 |
| Second test | 209375 | 165105 |
| Third test | 198958 | 131771 |
| Average value | 207639 | 141667 | ns
EXCEPTION HANDLING METHOD AND RELATED APPARATUS

CROSS-REFERENCE TO RELATED APPLICATIONS

This application is a continuation of International Application No. PCT/CN2022/077247, filed on Feb. 22, 2022, which claims priority to Chinese Patent Application No. 202110212148.1, filed on Feb. 25, 2021. The disclosures of the aforementioned applications are hereby incorporated by reference in their entireties.

TECHNICAL FIELD

This application relates to the field of computer technologies, and in particular, to an exception handling method and a related apparatus.

BACKGROUND

In the computer field, a high-level language generally needs to support an exception handling mechanism. The exception handling mechanism is a recovery mechanism for a program running fault, which can better handle a situation that a program cannot run normally.

Currently, an exception handling procedure usually includes steps such as exception throwing, high-level language context information obtaining, and exception jumping. In the step of obtaining high-level language context information, a status of a register needs to be restored to a status when a high-level language function is executed, so that a subsequent exception handling function can execute the exception handling procedure based on the status of the register. In a related technology, before a runtime function is called from a target high-level language function, a status of a register used when the high-level language function is executed needs to be backed up to a thread-local storage (TLS), and the status of the register is restored based on data backed up in the TLS when an exception occurs.

Because a status of the register needs to be backed up each time before the runtime function is called from the target high-level language function, statuses of the register are frequently backed up during running of a processor. Consequently, performance of the processor deteriorates seriously.

SUMMARY

This application provides an exception handling method. Because a called function (namely, a runtime function) saves a status of a register of a caller function (namely, a high-level language function) before execution, a return operation of the function is triggered when an exception occurs, so that the called function restores a status of a register. Finally, the status of the register is restored. When the exception occurs, the status of the register is restored by reusing a value of the register stored in the called function. In this way, a step of backing up the status of the register before the runtime function is called from the target high-level language function is avoided. This improves running performance of a terminal.

A first aspect of this application provides an exception handling method, which may be applied to a processor having registers. The method includes: The processor executes a first function, and calls a second function according to a call instruction of the first function, where the first function is a high-level language function, and the second function is a runtime function. The high-level language function refers to a program or code written in a high-level language that can be directly referenced by another program or code. The runtime function is a function that runs in a runtime environment, namely, a program or code that can be directly referenced by another program or code in the runtime environment. When the second function is called, the processor generates a stack frame corresponding to the second function. The stack frame is actually an area in a memory space allocated by the processor to the second function. The stack frame saves a status of a register of a caller function (namely, the first function) of the second function. The status of the register of the first function refers to a value stored in the callee-saved register before the first function calls the second function. The callee-saved register is a register that can be used by a function during calling. When the processor calls the second function and an exception occurs in a process of executing the second function, the processor is triggered to perform a return operation of the second function, where the return operation of the second function includes restoring a status of a first register used when the second function is executed to the status of the register of the first function, namely, a status before the first function calls the second function. The callee-saved register in the processor includes the first register. The processor performs exception handling based on the status of the first register, and the processor jumps to an exception catching address, to execute an exception handling function. The exception handling function performs exception handling during execution based on the status of the callee-saved register.

The status of the register of the first function saved in the stack frame corresponding to the second function is to enable the status of the callee-saved register in the processor to be restored to the status of the register of the first function when the second function completes execution and returns to the first function. In this way, in the process of executing the second function, the second function may temporarily store, by using the callee-saved register, operation data and an operation result that are generated in the process of executing the second function, without affecting subsequent normal execution of the first function. In this solution, when an exception occurs, a status of a register of a caller function is restored by reusing a value of a register stored in a called function. In this way, a step of backing up the status of the register before the runtime function is called from the target high-level language function can be avoided on the basis of ensuring normal exception handling. This improves running performance of the processor.

Optionally, in an implementation, in a process in which the processor performs the return operation of the second function, because the stack frame corresponding to the second function stores the status of the register of the first function and a return address of the second function, the processor may obtain the status of the register of the first function from the stack frame, namely, a value of the first register stored in the second function. Then, the processor updates, based on the obtained value of the first register, a value in the first register used when the second function is executed, to restore the status of the register. Finally, the processor jumps to the return address of the second function, to complete the return operation of the second function. The return address of the second function may be a statement next to a code statement for calling the second function in the first function.

In this solution, the status of the register is restored by obtaining the value of the register of the first function from the stack frame, and updating the status of the register used by the second function based on the obtained value of the register. Because the processor only restores statuses of some registers (namely, registers used by the second function), and does not need to restore statuses of all the registers in the processor, time consumed for restoring the statuses of the registers can be reduced, and exception handling efficiency can be improved.

Optionally, in an implementation, that the exception occurs in the process in which the processor executes the second function includes: The processor calls a third function in the process of executing the second function, and the third function throws the exception in an execution process. Then, the third function triggers a return operation, and returns a first return value to the second function. The second function obtains the first return value returned by the third function, where the first return value indicates that the exception occurs, and the third function is a function called by the second function. Simply put, when the second function obtains the return value returned by the function called by the second function, and the return value carries information indicating the exception, it may be considered that the exception occurs in the process in which the processor executes the second function, thereby triggering the return operation of the second function.

In this solution, when the second function receives the information indicating the exception returned by the third function called by the second function, the return operation of the second function is triggered, so that called functions of layers can be returned layer by layer, and finally the status of the register can be restored.

Optionally, in an implementation, when performing the return operation of the second function, the processor may further generate a second return value, where the second return value indicates that the exception occurs. Then, the processor returns the return value to the first function, to notify the first function that the exception has occurred. In other words, for each called function, a return value indicating that an exception occurs may be returned to a caller function of the function, so that the functions can be returned layer by layer based on the return value that carries information indicating the exception.

Optionally, in an implementation, that the exception occurs in the process in which the processor executes the second function includes: The processor detects, in the process of executing the second function, that an exception flag bit is set to an abnormal state. Simply put, the exception flag bit for indicating the abnormal state may be created in the processor. In the process of executing the second function, the processor may detect a status of the exception flag bit. When the exception flag bit is set to the abnormal state, the exception may occur in the process of executing the second function, thereby triggering the return operation of the second function. Generally, when no exception occurs, the exception flag bit is not set to the abnormal state. When any function throws the exception, the function may set the exception flag bit to the abnormal state, so that a subsequent function of each layer can detect the exception.

Optionally, in an implementation, that the exception occurs in the process in which the processor executes the second function includes: In the process in which the processor executes the second function, the second function throws the exception. For example, the second function throws the exception by using a throws statement.

Optionally, after the second function throws the exception, the processor may set the exception flag bit to the abnormal state, or the processor returns the second return value to the first function, where the second return value indicates that the exception occurs. The exception flag bit is set to the abnormal state or information indicating that the exception occurs is returned to the called function, to trigger the processor to perform a subsequent return operation of the caller function, so as to implement layer-by-layer return of the functions.

Optionally, in an implementation, before the processor performs the return operation of the second function, the method further includes: The processor modifies the return address of the second function to an address of a target function. The target function of the second function is used to jump to the exception catching address, where the exception catching address is a specified jump address obtained when the exception occurs. Simply put, the target function may be understood as a trampoline function, and the specified address can be jumped to by using the target function.

In this solution, in a case that the high-level language function cannot be triggered to return when the exception occurs through code modification, a return address of a first runtime function called by the high-level language function is modified to an address of a trampoline function. The trampoline function is used to jump to the specify jump address obtained when the exception occurs, thereby ensuring restoration of the status of the register.

Optionally, in an implementation, the method further includes: The processor obtains an exception table that matches the exception that occurs when the second function is executed. The processor obtains the exception catching address in the exception table, and determines the exception catching address as an address jumped to when the target function is executed.

The exception table is a table generated by a compiler in a compilation phase based on code, and different high-level language functions correspond to different exception tables. Therefore, the processor may determine the currently occurring exception matches an exception in which exception table. Then, the processor determines, based on the matched exception table, a specified jump address to which the target function needs to jump. The processor may search for a plurality of exception tables one by one based on an exception object and an exception type that correspond to the currently occurring exception, to obtain the exception table that matches the currently occurring exception, so as to obtain the exception table that matches the exception that occurs when the second function is executed. In this way, when determining the first runtime function (namely, the second function) called by the high-level language function, the processor may modify the return address of the second function to the address of the target function, and transfer, to the target function, the specified jump address that needs to be jumped to.

Optionally, in an implementation, the target function is further used to update exception parameters to a register, and the exception parameters are used to perform exception handling after the exception catching address is jumped to. The exception parameters may include the exception object and the exception type. This exception parameter is usually used when the exception catching address is jumped to, to perform subsequent exception handling. Therefore, before the exception catching address is jumped to, the target function updates the exception parameters to a specific register (for example, a parameter transfer register), to ensure normal subsequent exception handling.

A second aspect of this application provides an exception handling apparatus, including an obtaining unit and a processing unit. The processing unit is configured to: call a second function according to a call instruction of a first function, where the first function is a high-level language function, and the second function is a runtime function; when an exception occurs in a process of executing the second function, execute a return operation of the second function, where the return operation of the second function includes restoring a status of a first register used when the second function is executed to a status before the first function calls the second function; and perform exception handling based on the status of the first register.

Optionally, in an implementation, the obtaining unit is configured to obtain, from a stack frame, a return address of the second function and a value of the first register stored in the second function. The processing unit is further configured to update, based on the value of the first register, a value in the first register used when the second function is executed. The processing unit is further configured to jump to the return address of the second function.

Optionally, in an implementation, the obtaining unit is further configured to obtain, in the process of executing the second function, a first return value returned by a third function, where the first return value indicates that the exception occurs, and the third function is a function called by the second function.

Optionally, in an implementation, the processing unit is further configured to detect, in the process of executing the second function, that an exception flag bit is set to an abnormal state.

Optionally, in an implementation, the processing unit is further configured to trigger, in the process of executing the second function, the second function to throw the exception.

Optionally, in an implementation, the processing unit is further configured to generate a second return value, where the second return value indicates that the exception occurs. The processing unit is further configured to return the return value to the first function.

Optionally, in an implementation, the processing unit is further configured to set an exception flag bit to an abnormal state.

Optionally, in an implementation, the processing unit is further configured to modify the return address of the second function to an address of a target function, where the target function is used to jump to an exception catching address, and the exception catching address is a specified jump address obtained when the exception occurs.

Optionally, in an implementation, the obtaining unit is further configured to obtain an exception table that matches the exception that occurs when the second function is executed. The obtaining unit is further configured to: obtain the exception catching address in the exception table, and determine the exception catching address as an address jumped to when the target function is executed.

Optionally, in an implementation, the target function is further used to update exception parameters to a register, and the exception parameters are used to perform exception handling after the exception catching address is jumped to.

A third aspect of this application provides an exception handling apparatus, where the exception handling apparatus includes a processor, a non-volatile memory, and a volatile memory. The non-volatile memory or the volatile memory stores computer-readable instructions. The processor reads the computer-readable instructions, so that the exception handling apparatus implements the method according to any implementation of the first aspect.

A fourth aspect of this application provides a computer-readable storage medium. The computer-readable storage medium stores a computer program. When the computer program is run on a computer, the computer is enabled to perform the method according to any implementation of the first aspect.

A fifth aspect of this application provides a computer program product. When the computer program product runs on a computer, the computer is enabled to perform the method according to any implementation of the first aspect.

A sixth aspect of this application provides a chip, including one or more processors. A part or all of the processors are configured to read and execute computer programs stored in a memory, to perform the method in any implementation of the first aspect.

Optionally, the chip includes the memory, and the processor is connected to the memory through a circuit or an electric wire. Optionally, the chip further includes a communication interface, and the processor is connected to the communication interface. The communication interface is configured to receive data and/or information that needs to be processed. The processor obtains the data and/or the information from the communication interface, processes the data and/or the information, and outputs a processing result through the communication interface. The communication interface may be an input/output interface. The method provided in this application may be implemented by one chip, or may be jointly implemented by a plurality of chips.

DESCRIPTION OF EMBODIMENTS

Figure 1:
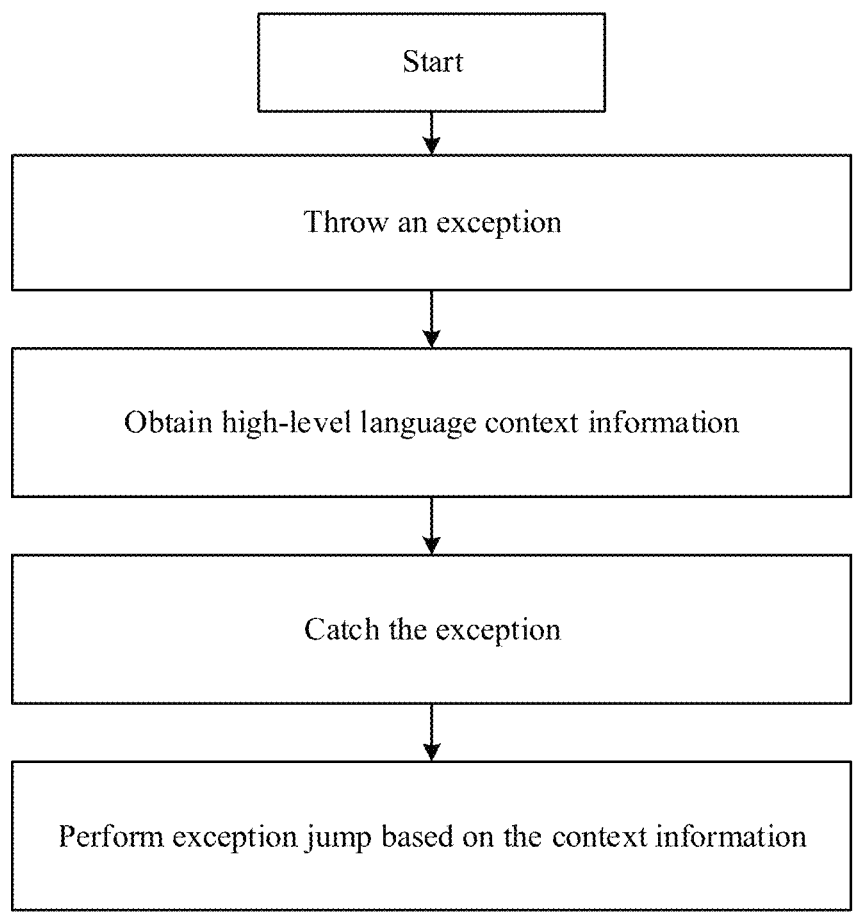
FIG. 1 is a flowchart of exception handling in a related technology.

The following describes embodiments of this application with reference to accompanying drawings. It is clear that the described embodiments are merely some but not all of embodiments of this application. A person of ordinary skill in the art may learn that technical solutions provided in embodiments of this application are also applicable to a similar technical problem as a technology develops and a new scenario emerges.

In the specification, claims, and the accompanying drawings of this application, the terms "first", "second", and so on are intended to distinguish between similar objects but do not necessarily indicate a specific order or sequence. It should be understood that the data termed in such a way is interchangeable in proper circumstances so that embodiments described herein can be implemented in other orders than the order illustrated or described herein. In addition, the terms "include", "contain" and any other variants mean to cover the non-exclusive inclusion, for example, a process, method, system, product, or device that includes a list of steps or modules is not necessarily limited to those steps or modules, but may include other steps or modules not expressly listed or inherent to such a process, method, product, or device. Names or numbers of steps in this application do not mean that the steps in the method procedure need to be performed in a time/logical sequence indicated by the names or numbers. An execution sequence of the steps in the procedure that have been named or numbered can be changed based on a technical objective to be achieved, provided that same or similar technical effect can be achieved.

For ease of understanding, the following describes technical terms in embodiments of this application.

A high-level language is a machine-independent and process- or object-oriented language. Compiling the high-level language by a compiler can compile the high-level language into an assembly language that a machine can recognize. High-level languages include but are not limited to C++, Java, Swift, Python, Ruby, and Scala.

A high-level language function refers to a program or code written in the high-level language that can be directly referenced by another program or code.

Runtime refers to a running environment used to support assembly language execution, and generally exists in a form of a library. The runtime includes but is not limited to a common language runtime (CLR), a Java virtual machine, an ART, a C++ runtime, and the like.

A runtime function is a function that runs in a runtime environment, namely, a program or code that can be directly referenced by another program or code in the runtime environment.

An exception table is a table generated by the compiler in a compilation phase based on code to assist in exception handling in a runtime phase. The exception table contains all necessary information required for exception handling in the runtime, for example, an exception type and an exception object.

A register is a small storage area for storing data inside a processor, and can be used to temporarily store data involved in an operation and an operation result.

A callee-saved register is a register that can be used when a function is called. A processor may include a plurality of callee-saved registers.

A parameter transfer register is used to store a parameter transferred between functions. The parameter transfer register is usually not used during calling of the function.

Register restoration: During code running, a function A calls a function B. At a start position of the function B, a status of a register of the function A is saved (namely, a value stored in the register before the function A calls the function B). During execution of the function B, the function B can temporarily store data involved in an operation and an operation result by using the register. When the function B exits after execution, the status of the register saved at the start position is restored. A status of the register is restored to the status of the register of the function A. This process is called register restoration. A stack frame refers to an environment in which a function runs. When each function is called, a data structure called a stack frame is formed in a stack area. This data structure stores data such as a status of a register of a caller function of a current function, a function parameter, a local variable of the function, and a return address after the function is executed.

A stackmap indicates a position map of a register in a stack frame structure generated by the compiler at each function call point.

A stack growth direction is a function calling direction. In an arrow direction, functions are called in sequence.

In the computer field, the high-level language generally needs to support an exception handling mechanism. The exception handling mechanism is a recovery mechanism for a program running fault, which can better handle a situation that a program cannot run normally. Simply put, the exception handling mechanism is a mechanism that executes preset exception handling logic on a program when an exception occurs.

FIG. 1 is a flowchart of exception handling in a related technology. As shown in FIG. 1, in the related technology, an exception handling procedure usually includes steps such as exception throwing, high-level language context information obtaining, exception catching, and exception jumping. In the step of obtaining high-level language context information, a status of a register is actually restored to a status of a register of a high-level language function, namely, a status of the register before the high-level language function calls another function, to facilitate subsequent exception handling. In the related technology, before a runtime function is called from the target high-level language function, the status of the register used when the high-level language function is executed needs to be backed up to a thread-local storage TLS, and the status of the register is restored based on data backed up in the TLS when an exception occurs.

Figure 2:
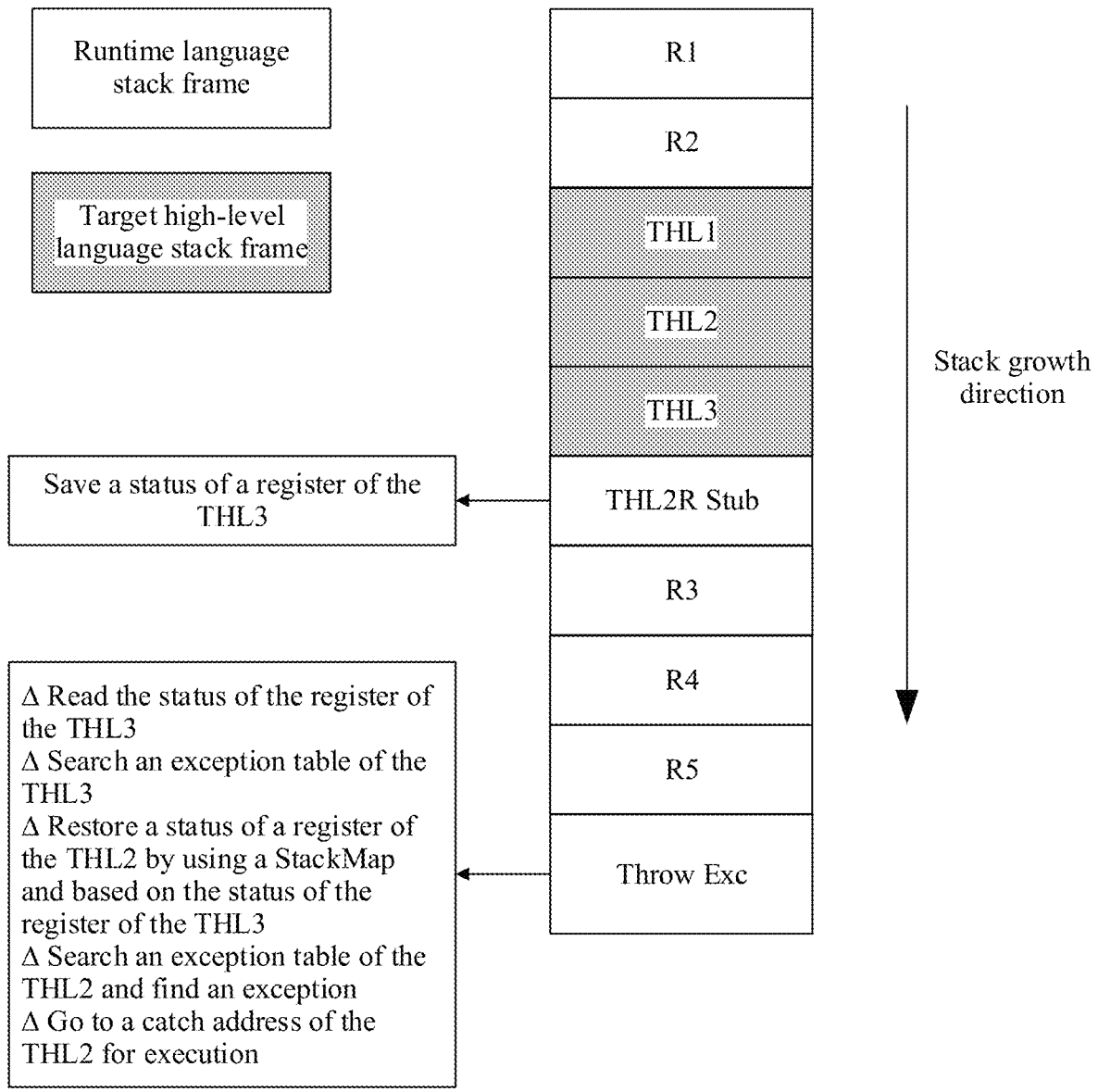
FIG. 2 is a flowchart of performing exception handling in a related technology.

FIG. 2 is a flowchart of performing exception handling in a related technology. In FIGS. 2, R1, R2, R3, R4, and R5 represent different functions in runtime. THL1, THL2, and THL3 represent different target high-level language (THL) functions. THL2R Stub represents a function for backing up a status of a register before a runtime function is called from a target high-level language function. Throw Exc represents a function for handling an exception after the exception is thrown. A stack growth direction indicates a function calling direction. R1→R2→THL1→THL2→THL3→THL2R Stub→R3→R4→R5→Throw Exc are called in sequence.

In FIG. 2, the steps of performing exception handling are as follows:

Step 1: Before the runtime function R3 is called from the target high-level language function THL3, the THL2R Stub function stores a status of a register of the THL3 into a thread-local storage (TLS).

Step 2: After the runtime is called from the THL2R Stub, execute the functions R3, R4, and R5 in sequence until R5 throws the exception by using the Throw Exc.

Step 3: When the Throw Exc starts to perform exception handling, read the status of the register stored in the THL3 from the TLS.

Step 4: Start to search for an exception table based on the status of the register of the THL3, and search for whether an exception matching the currently occurring exception exists in the exception table corresponding to the THL3.

Step 5: When it is found that no exception can be caught in the exception table corresponding to the THL3, restore the status of the register to a status of a register of the THL2 based on the status of the register of the THL3 and information in a stackmap.

Step 6: Search for an exception table corresponding to the THL2 to determine whether an exception matching the currently occurring exception exists.

Step 7: When the exception is caught in the exception table corresponding to the THL2, the status of the register and a caught exception jump address of the THL2 are used to implement jump execution, that is, jump to the exception jump address in the THL2 to continue executing exception handling.

It can be learned from the steps of performing exception handling in FIG. 2 that, in the related technology, before the runtime function is called from the target high-level language function, the status of the register of the target high-level language function needs to be backed up. In addition, when the exception is detected, the status of the register is restored based on backed-up information.

Because a status of the register needs to be backed up each time before the runtime function is called from the target high-level language function, statuses of the register are frequently backed up during running of a processor. Consequently, performance of the processor deteriorates seriously.

In view of this, an embodiment of this application provides an exception handling method. Because a called function saves a status of a register of a called function before execution, a return operation of the function is triggered when an exception occurs, so that called functions restore statuses of registers layer by layer. Finally, the status of the register is restored. When an exception occurs, a status of a register is restored by using information saved in a called function of each layer. In this way, a step of backing up a status of a register before a runtime function is called from a target high-level language function is avoided, that is, frequent backup of statuses of registers is avoided. This improves running performance of a processor.

The processor in this embodiment of this application may be a processor that can execute the high-level language function and the runtime function. The processor may be integrated into a terminal. For example, the terminal may be a personal computer (PC), a notebook computer, a server, a mobile phone, a tablet computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, or a wireless terminal in a smart home. The terminal may be a device that runs an Android system, an iOS system, a Windows system, or another system.

Figure 3:
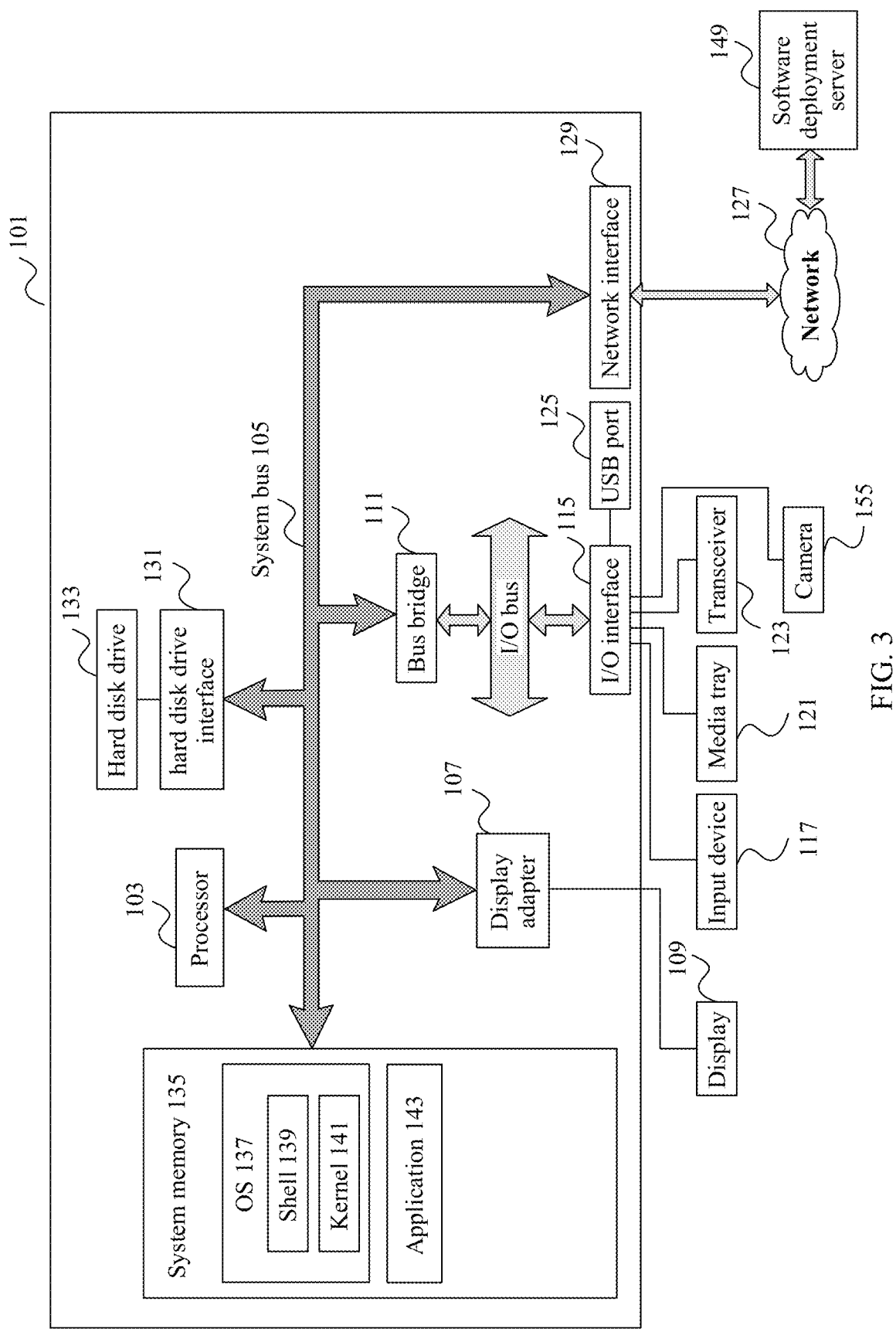
FIG. 3 is a diagram of a structure of a terminal 101 according to an embodiment of this application.

FIG. 3 is a diagram of a structure of a terminal 101 according to an embodiment of this application. As shown in FIG. 3, the terminal 101 includes a processor 103, and the processor 103 is coupled to a system bus 105. The processor 103 may be one or more processors, and each processor may include one or more processor cores. The terminal 101 further includes a display adapter (video adapter) 107. The display adapter may drive a display 109, and the display 109 is coupled to the system bus 105. The system bus 105 is coupled to an input/output (I/O) bus via a bus bridge 111. An I/O interface 115 is coupled to the I/O bus. The I/O interface 115 communicates with a plurality of I/O devices, such as an input device 117 (for example, a touchscreen), a media tray 121 (for example, a compact disc read-only memory (CD-ROM)), and a multimedia interface. A transceiver 123 (which may transmit and/or receive radio communication signals), a camera 155 (which may capture still and dynamic digital video images), and an external USB port 125. Optionally, an interface connected to the I/O interface 115 may be a USB interface.

The processor 103 may be any conventional processor, including a reduced instruction set computing (RISC) processor, a complex instruction set computing (CISC) processor, or a combination thereof. Optionally, the processor may be a dedicated apparatus such as an ASIC.

The terminal 101 may communicate with a software deployment server 149 through a network interface 129. For example, the network interface 129 is a hardware network interface, for example, a network adapter. A network 127 may be an external network, for example, the internet, or may be an internal network, for example, the Ethernet or a virtual private network (VPN). Optionally, the network 127 may alternatively be a wireless network, for example, a Wi-Fi network or a cellular network.

A hard disk drive interface 131 is coupled to the system bus 105. The harddisk drive interface is connected to a hard disk drive 133. A system memory 135 is coupled to the system bus 105. Data running in the system memory 135 may include an operating system (OS) 137, an application 143, and a scheduling table of the terminal 101.

The operating system includes a shell 139 and a kernel 141. The shell 139 is an interface between a user and the kernel of the operating system. The shell is an outermost layer of the operating system. The shell manages interaction between the user and the operating system: waiting for an input of the user, interpreting the input of the user to the operating system, and processing output results of various operating systems.

The kernel 141 includes those parts of the operating system that are used to manage a memory, a file, a peripheral, and a system resource. The kernel 141 directly interacts with hardware. The operating system and the kernel generally run processes, provide inter-process communication, and provide CPU time slice management, interrupt, memory management, I/O management, and the like.

For example, when the terminal 101 is a server, the application 143 includes a cloud computing-related program. In an embodiment, when the application 143 needs to be executed, the terminal 101 may download the application 143 from the software deployment server 149. In an embodiment, when the terminal 101 downloads the application 143 from the software deployment server 149, the terminal 101 may also download, from the software deployment server 149, the scheduling table corresponding to the application 143.

The foregoing describes an application scenario of the exception handling method provided in embodiments of this application, and the following describes an execution process of the exception handling method in detail.

Figure 4:
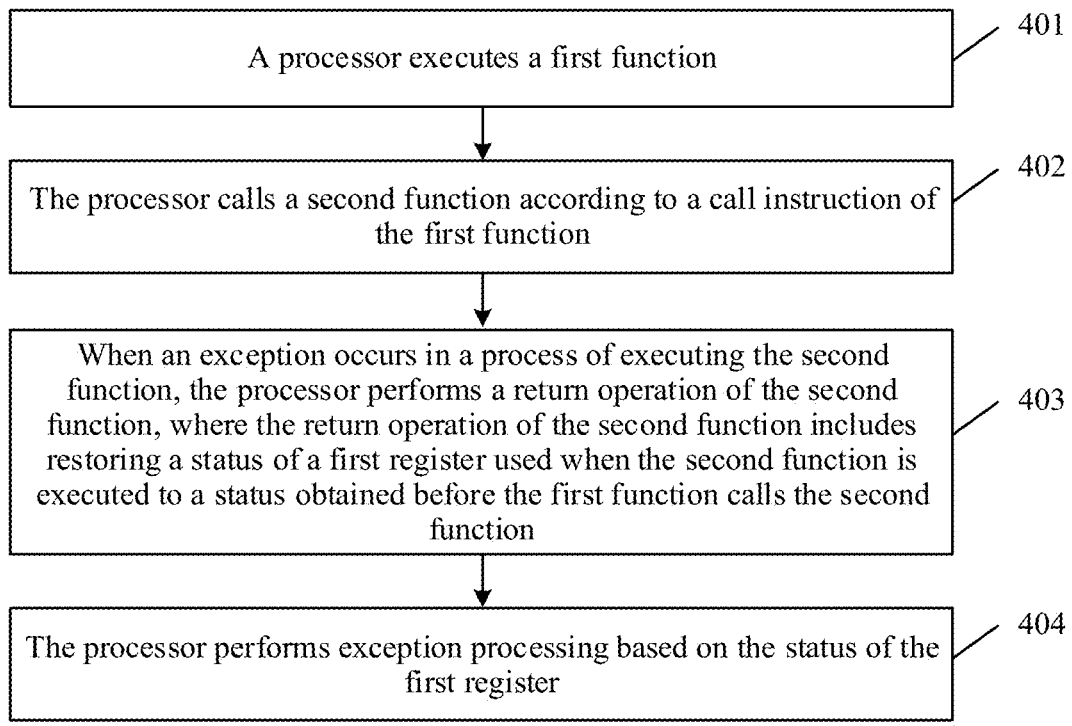
FIG. 4 is a flowchart of an exception handling method according to an embodiment of this application.

FIG. 4 is a flowchart of an exception handling method according to an embodiment of this application. As shown in FIG. 4, the exception handling method includes the following steps.

Step 401: A processor executes a first function.

In this embodiment, the first function may be a high-level language function. For example, the first function may be a function in any program in the processor, and the processor executes the first function in a process of executing the program. Programs in the processor can be written in any high-level language, for example, C++, Java, Swift, Python, Ruby, and Scala.

Step 402: The processor calls a second function according to a call instruction of the first function.

The first function includes the call instruction for calling the second function. Therefore, in a process of executing the first function, the processor calls the second function according to the call instruction in the first function.

When the second function is called, the processor generates a stack frame corresponding to the second function. The stack frame saves data such as a status of a register of a caller function (namely, the first function) of the second function, a parameter of the second function, a local variable of the second function, and a return address of the second function.

The status of the register of the first function saved in the stack frame corresponding to the second function is to enable a status of a register to be restored to the status of the register of the first function when the second function completes execution and returns to the first function. In this way, in a process of executing the second function, the second function may temporarily store, by using the register, operation data and an operation result that are generated in the process of executing the second function, without affecting subsequent normal execution of the first function.

Step 403: When an exception occurs in the process of executing the second function, the processor performs a return operation of the second function, to restore the status of the first register used when the second function is executed to the status before the first function calls the second function.

When the exception occurs in the process in which the processor executes the second function, the processor is triggered to execute the return operation of the second function, to restore the status of the register to the status of the register of the first function, namely, the status of the register obtained before the first function calls the second function.

For example, in a process in which the processor performs the return operation of the second function, because the stack frame corresponding to the second function stores the status of the register of the first function, the processor may obtain the status of the register of the first function from the stack frame, namely, a value of the register stored in the second function. Then, the processor updates, based on the obtained value of the register, a value in the first register used when the second function is executed, to restore the status of the register. Finally, the processor jumps to the return address of the second function, to complete the return operation of the second function. The return address of the second function may be a statement next to a code statement for calling the second function in the first function.

Step 404: The processor performs exception handling based on the status of the first register.

The processor may jump to an exception catching address (namely, a specified jump address obtained when the exception occurs), to execute an exception handling function. The exception handling function performs exception handling during execution based on the status of the callee-saved register.

It may be understood that, in this embodiment, an example in which the second function is a first runtime function called by the high-level language function is used to describe a process of restoring the status of the register. In actual application, when an exception occurs in any runtime function in an execution process, the runtime function can be triggered to return to a caller function (namely, a function that calls the runtime function). In other words, any called function in the processor may return immediately when an exception occurs, thereby restoring a status of a register. In this case, when a plurality of layers of functions are called in sequence, each layer of functions is returned in sequence, and statuses of registers are restored in sequence, and finally a status of a register is restored to a status before a first function is called.

Figure 5:
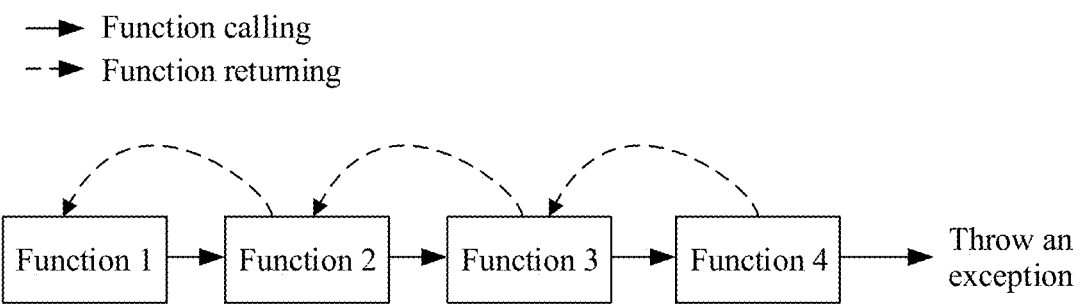
FIG. 5 is a diagram of function calling and register status restoration according to an embodiment of this application.

Refer to FIG. 5. FIG. 5 is a diagram of function calling and register status restoration according to an embodiment of this application. As shown in FIG. 5, a function 1 calls a function 2, the function 2 calls a function 3, the function 3 calls a function 4, and the function 4 throws an exception in an execution process. Then, the function 4 returns to the function 3 and restores a status of a register to a status of a register of the function 3. The function 3 returns to the function 2 and restores the status of the register to a status of a register of the function 2. The function 2 returns to the function 1 and restores the status of the register to a status of a register of the function 1. In this way, a function return direction is opposite to a function calling direction, and a status of a register is finally restored to a status before a first function is called by returning functions layer by layer.

In this way, when an exception occurs, a status of the register is restored by reusing a value of a register saved in a called function of each layer. In this way, a step of backing up a status of a register before the runtime function is called from the target high-level language function can be avoided on the basis of ensuring normal exception handling, and frequent backup of statuses of the register is avoided. This improves running performance of the processor.

In addition, in a related technology, values of all registers are backed up, and statuses of all the registers are restored based on backed-up content when an exception occurs. Therefore, in the related technology, it usually takes a long time to back up and restore the statuses of the registers. In this embodiment, because most called functions do not need to use all the registers during execution, the called functions usually restore statuses of some registers (namely, registers used by the called functions) when returning to the caller function. Compared with restoring the statuses of all the registers in the related technology, in this embodiment, only the statuses of some registers are restored, so that time consumed for restoring the statuses of the registers can be reduced, and exception handling efficiency can be improved.

In addition, in the related technology, register status backup and restoration are implemented by using a TLS. During backup and restoration, an operation such as data check is usually further included, which further increases the consumed time. However, in this embodiment, the status of the register is restored based on data stored by the called function and on the stack frame, and only a simple read/write operation needs to be performed on to-be-restored data, which consumes short time.

The foregoing describes the exception handling procedure performed when the exception occurs during function execution. The following describes cases in which the exception occurs during function execution.

In this embodiment, there may be a plurality of cases in which the exception occurs in the process of executing the second function.

Case 1: The exception is thrown by another function called by the second function, and information indicating the exception is returned to the second function.

For example, the processor calls a third function in the process of executing the second function, and the third function throws the exception in an execution process. In this case, the third function triggers a return operation, and returns a first return value to the second function. In this case, the second function may obtain the first return value returned by the third function, where the first return value indicates that the exception occurs, and the third function is a function called by the second function. Simply put, when the second function obtains the return value returned by the function called by the second function, and the return value carries the information indicating the exception, it may be considered that the exception occurs in the process of executing the second function, thereby triggering the return operation of the second function.

Optionally, when performing the return operation of the second function, the processor may further generate a second return value, where the second return value indicates that the exception occurs. Then, the processor returns the return value to the first function, to notify the first function that the exception has occurred. In other words, for each called function, a return value indicating that the exception occurs may be returned to a caller function of the function, so that functions can be returned layer by layer based on the return value that carries the information indicating the exception.

Case 2: In the process of executing the second function, it is detected that a flag bit indicating an abnormal state is set to the abnormal state.

For example, an exception flag bit indicating the abnormal state may be created in the processor. For example, the processor creates a byte bit in a memory, and the byte bit indicates the abnormal state. In the process of executing the second function, the processor may detect a status of the exception flag bit. When the exception flag bit is set to the abnormal state, the exception may occur in the process of executing the second function, thereby triggering the return operation of the second function. Generally, when no exception occurs, the exception flag bit is not set to the abnormal state. When any function throws the exception, the function may set the exception flag bit to the abnormal state, so that a subsequent function of each layer can detect the exception.

Case 3: In the process of executing the second function, the second function throws the exception.

Optionally, the second function may throw the exception by using a throws statement.

Optionally, when the second function throws the exception, the second function may notify, by returning the return value to the first function, the first function that the exception has occurred. Alternatively, the second function may notify, by setting the exception flag bit to the abnormal state, the first function that the exception has occurred.

In an embodiment, the second function may be a runtime function. In a process of writing the second function, writing of the second function is restricted according to a coding constraint rule, so that when the exception occurs in the process of executing the second function, the processor can perform the return operation of the second function.

For example, a writing manner of the second function is shown as follows:

```
Func1: //function 1
    normal code //normal code
        if have exception //if have exception
        return //return
    normal code //normal code
```

It can be learned from the foregoing writing manner that, in a process of writing the runtime function, the foregoing statements may be added to a scenario in which the exception may be thrown to perform exception detection, so that the runtime function returns when the exception is detected.

For example, another writing manner of the second function is shown as follows:

```
Func1: //function 1
    normal code //normal code
        if exception = True //if the exception flag bit is set to the abnormal
        state
        return //return
    normal code //normal code
```

It can be learned from the foregoing writing manner that, in a process of writing the runtime function, the foregoing statements may be added to a scenario in which the exception may be thrown to detect the status of the exception flag bit, so as to implement exception detection.

Generally speaking, a code change at runtime is unaware to a high-level language writer, and the runtime only provides an environment in which the high-level language runs. A statement used for exception detection is added to the runtime function, so that it can be ensured that when the exception occurs, the runtime function returns immediately without executing other code logic.

Because the high-level language function is usually written by a developer, it is difficult to restrict writing of the high-level language function according to the coding constraint rule. Therefore, in some cases, it is not possible to change code to make the high-level language function return when the exception occurs.

Based on this, this embodiment provides a trampoline function. When the runtime function needs to return the high-level language function, a return address of the runtime function is modified to an address of the trampoline function. The trampoline function jumps to a specified jump address obtained when the exception occurs, or triggers returning of the high-level language function.

For example, before the processor performs the return operation of the second function, the method further includes: The processor modifies the return address of the second function to an address of a target function. The target function is used to jump to the exception catching address, where the exception catching address is a specified jump address obtained when the exception occurs. Simply put, the target function may be understood as a trampoline function, and a specified address can be jumped to by using the target function.

It may be understood that, when the foregoing first function is a high-level language function, and the foregoing second function is a runtime function, the second function is the target function, and the processor may modify the return address of the second function to the address of the target function.

Optionally, an operation in which the processor obtains the second function and modifies the return address of the second function may be implemented by executing an exception throwing function. For example, after a runtime function throws the exception, the runtime function may call the exception throwing function. The exception throwing function is used to obtain the second function and modify the return address of the second function. After the exception throwing function completes a series of processing steps, the exception throwing function returns and causes subsequent runtime functions to return layer by layer.

Optionally, after the runtime function calls the exception throwing function, the processor executes the exception throwing function, to perform the following steps: The processor obtains an exception table that matches the exception that occurs when the second function is executed. The processor obtains the exception catching address in the exception table, and determines the exception catching address as an address jumped to when the target function is executed. The processor obtains the second function, and modifies the return address of the second function to the address of the target function.

The exception table is a table generated by a compiler in a compilation phase based on code, and different high-level language functions correspond to different exception tables. Therefore, the processor may determine the currently occurring exception matches an exception in which exception table. Then, the processor determines, based on the matched exception table, the specified jump address to which the target function needs to jump. The processor may search for a plurality of exception tables one by one based on an exception object and an exception type that correspond to the currently occurring exception, to obtain the exception table that matches the currently occurring exception, so as to obtain the exception table that matches the exception that occurs when the second function is executed. In this way, when determining a first runtime function (namely, the second function) called by the high-level language function, the processor may modify the return address of the second function to the address of the target function, and transfer, to the target function, the specified jump address that needs to be jumped to.

Optionally, the target function is further used to update exception parameters to a register, and the exception parameters are used to perform exception handling after the exception catching address is jumped to. The exception parameters may include the exception object and the exception type. This exception parameter is usually used when the exception catching address is jumped to, to perform subsequent exception handling. Therefore, before the exception catching address is jumped to, the target function updates the exception parameters to a specific register (for example, a parameter transfer register), to ensure normal subsequent exception handling.

For example, in a process of executing the exception throwing function, the exception parameters can be obtained, and the exception parameters is stored in a global variable, so that the target function can obtain the exception parameters from the global variable. In other words, the exception throwing function transfers the exception parameters to the target function by saving the exception parameters in the global variable. When the second function returns and jumps to the target function, the target function can obtain the exception parameters from the global variable, and update the exception parameters to the parameter transfer register.

In a layer-by-layer return process of runtime functions, the runtime function usually restores a status of a callee-saved register. Therefore, transfer of the exception parameters is not possible through only layer-by-layer return of the runtime functions. In addition, a value in the parameter transfer register may be changed during layer-by-layer return of the runtime functions. Therefore, in this embodiment, the trampoline function updates the exception parameters to the parameter transfer register before the exception catching address is jumped to, so that when the exception catching address is jumped to, to perform subsequent exception handling, the exception parameters in the parameter transfer register can be effectively obtained, thereby ensuring that the exception handling process can be performed properly.

For ease of understanding, the following describes in detail a procedure in which the processor performs exception handling with reference to accompanying drawings.

Figure 6:
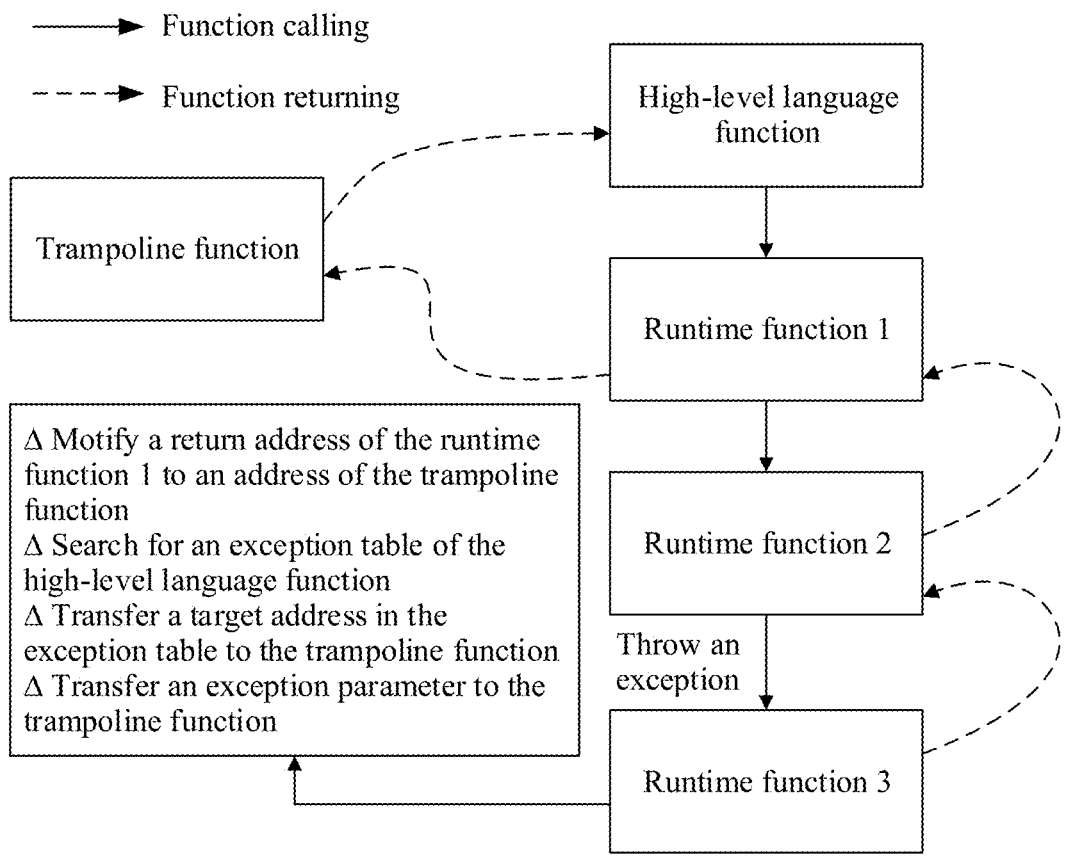
FIG. 6 is a flowchart of exception handling according to an embodiment of this application.

FIG. 6 is a flowchart of exception handling according to an embodiment of this application. As shown in FIG. 6, a procedure in which a processor performs exception handling includes the following steps.

Step 1: A high-level language function to a runtime function 3 are called in sequence.

In a running process of the processor, the high-level language function calls a runtime function 1, and the runtime function 1 calls a runtime function 2. The runtime function 2 calls the runtime function 3 after throwing an exception.

Step 2: The runtime function 3 determines the runtime function 1, and modifies a return address of the runtime function 1 to an address of a trampoline function.

In this embodiment, the runtime function 1 corresponds to the foregoing second function, and the runtime function 1 is a first function called by the high-level language function. The runtime function 3 may obtain the runtime function 1 in a stack rollback manner, and it is determined that the runtime function 1 is the first function called by the high-level language function. Then, the runtime function 3 modifies the return address of the runtime function 1 to the address of the trampoline function, so that the runtime function 1 can jump to the trampoline function instead of jumping to the high-level language function during returning.

Step 3: The runtime function 3 searches for an exception table of the high-level language function.

The runtime function 3 may obtain the exception table of the high-level language function and exception parameters corresponding to the currently occurring exception, namely, an exception object and an exception type that correspond to the currently occurring exception. Then, the runtime function 3 searches for the exception table of the high-level language function to determine whether the exception table of the high-level language function includes an exception that matches the currently occurring exception.

Step 4: The runtime function 3 transfers an exception catching address in the exception table to the trampoline function.

When the runtime function 3 determines that the exception table of the high-level language function matches, in other words, the exception table of the high-level language function includes the currently occurring exception, the runtime function 3 obtains a specified jump address (namely, the exception catching address) in the exception table. The specified jump address is a specified jump address obtained when the exception occurs. Then, the runtime function 3 stores the obtained exception catching address in a global variable, to transfer the exception catching address to the trampoline function.

Step 5: The runtime function 3 transfers the exception parameters to the trampoline function.

In a process of executing the runtime function 3, the runtime function 3 obtains the exception parameters corresponding to the currently occurring exception, for example, the exception object and the exception type. The runtime function 3 may store the obtained exception parameter in the global variable, to transfer the exception parameters to the trampoline function.

Step 6: The runtime function 3 to the trampoline function return in sequence.

After the runtime function 3 executes a series of exception handling steps, the runtime function 3 returns to the runtime function 2 and restores a status of a register of the runtime function 2. The runtime function 2 returns the runtime function 1 and restores a status of a register of the runtime function 1. Because the return address of the runtime function 1 is modified to the address of the trampoline function, the runtime function 1 returns to the trampoline function and restores the status of the register to a status of a register of the high-level language function.

In other words, after the runtime function 1 returns, the status of the register has been restored to the status of the register of the high-level language function, but the runtime function 1 actually jumps to the trampoline function after returning.

Step 7: The trampoline function obtains the exception parameters transferred by the runtime function 3, and updates the exception parameters to a parameter transfer register.

Because the runtime function 3 stores the exception parameters in the global variable, the trampoline function may obtain, from the global variable, the exception parameters stored in the runtime function 3, and update the exception parameters to the parameter transfer register.

Step 8: The trampoline function obtains the exception catching address transferred by the runtime function 3, and jumps to the exception catching address.

Similarly, because the runtime function 3 stores the exception catching address in the global variable, the trampoline function may obtain, from the global variable, the exception catching address stored in the runtime function 3, and jump to the exception catching address.

The exception catching address may be an address of a specified function, where the specified function is a function that is specified in the high-level language function and that is used to process the currently occurring exception. In this way, after the trampoline function jumps to the exception catching address, the specified function continues to perform subsequent exception handling.

Figure 7:
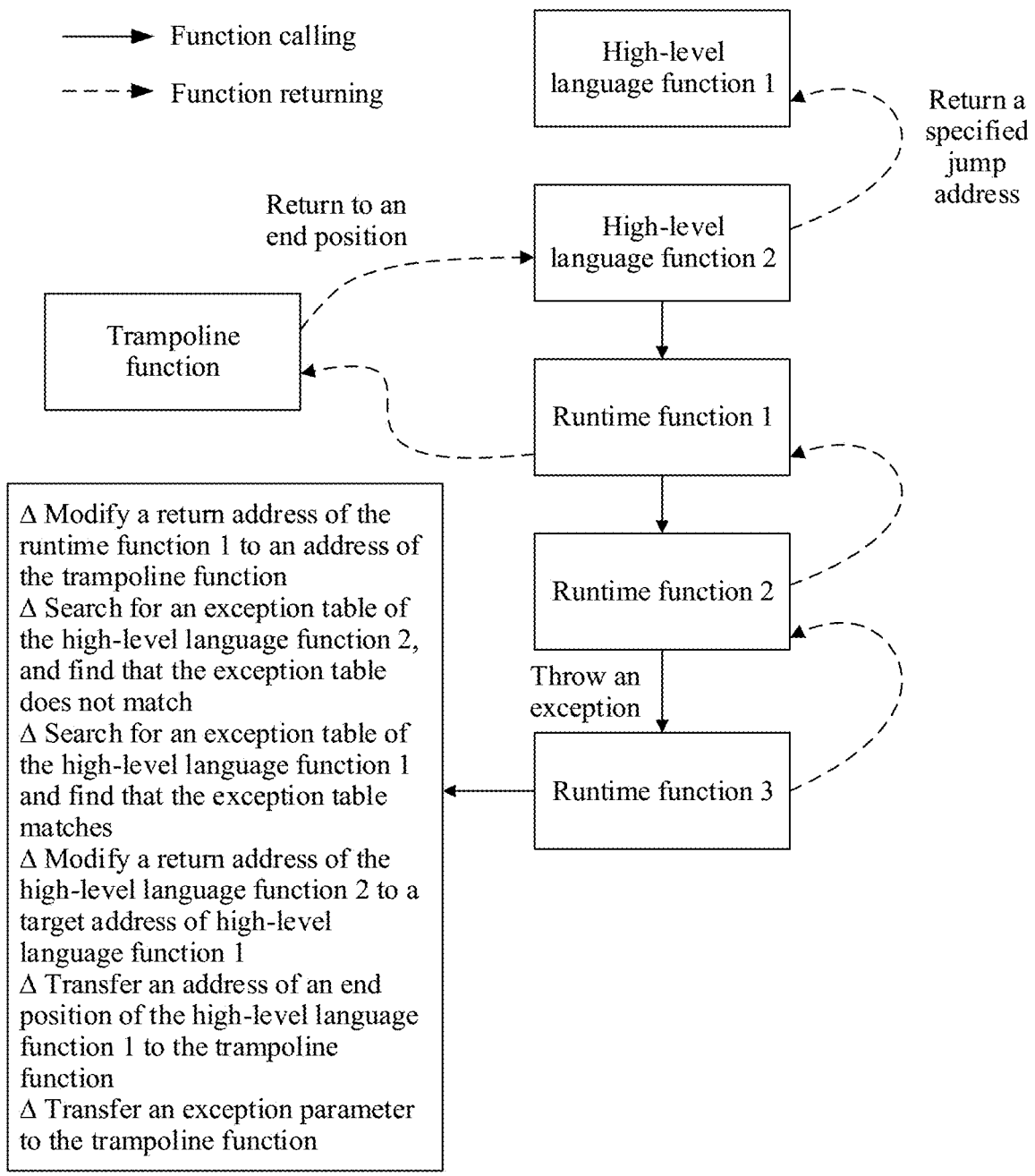
FIG. 7 is a flowchart of exception handling according to an embodiment of this application.

FIG. 7 is a flowchart of exception handling according to an embodiment of this application. As shown in FIG. 7, a procedure in which a processor performs exception handling includes the following steps.

S1: A high-level language function 1 to a runtime function 3 are called in sequence.

In a running process of the processor, the high-level language function 1 calls a high-level language function 2, the high-level language function 2 calls a runtime function 1, and the runtime function 1 calls a runtime function 2. The runtime function 2 calls the runtime function 3 after throwing an exception.

S2: The runtime function 3 determines the runtime function 1, and modifies a return address of the runtime function 1 to an address of a trampoline function.

In this embodiment, step S2 is similar to step 2 in the embodiment corresponding to FIG. 6. For details, refer to the foregoing step 2. Details are not described herein again.

S3: The runtime function 3 searches for an exception table of the high-level language function 2.

The runtime function 3 may obtain the exception table of the high-level language function 2 and exception parameters corresponding to the currently occurring exception, namely, an exception object and an exception type that correspond to the currently occurring exception. Then, the runtime function 3 searches for the exception table of the high-level language function 2 to determine whether the exception table of the high-level language function includes an exception that matches the currently occurring exception.

S4: The runtime function 3 searches for an exception table of the high-level language function 1.

When the runtime function 3 determines that the exception table of the high-level language function 2 does not match, in other words, the exception table of the high-level language function 2 does not include the currently occurring exception, the runtime function 3 continues to search for the exception table of the high-level language function 1.

S5: The runtime function 3 modifies a return address of the high-level language function 2 to an exception catching address.

When the runtime function 3 determines that the exception table of the high-level language function 1 matches, in other words, the exception table of the high-level language function 1 includes the currently occurring exception, the runtime function 3 may determine a specified jump address (namely, the exception catching address) finally jumped to in the exception table corresponding to the high-level language function 1. Therefore, the runtime function 3 may obtain the specified jump address in the exception table corresponding to the high-level language function 1, where the specified jump address is a specified jump address obtained when the exception occurs.

Then, the runtime function 3 modifies the return address of the high-level language function 2 to the obtained exception catching address, so that the high-level language function 2 jumps to the exception catching address during returning.

S6: The runtime function 3 transfers an address of an end position of the high-level language function 1 to the trampoline function.

The runtime function 3 obtains the address of the end position of the high-level language function 1, and saves the address of the end position of the high-level language function 1 to a global variable, to transfer the address of the end position of the high-level language function 1 to the trampoline function.

S7: The runtime function 3 transfers the exception parameters to the trampoline function.

In a process of executing the runtime function 3, the runtime function 3 obtains the exception parameters corresponding to the currently occurring exception, for example, the exception object and the exception type. The runtime function 3 may store the obtained exception parameter in the global variable, to transfer the exception parameters to the trampoline function.

S8: The runtime function 3 to the trampoline function return in sequence.

After the runtime function 3 executes a series of exception handling steps, the runtime function 3 returns to the runtime function 2 and restores a status of a register of the runtime function 2. The runtime function 2 returns the runtime function 1 and restores a status of a register of the runtime function 1. Because the return address of the runtime function 1 is modified to the address of the trampoline function, the runtime function 1 returns to the trampoline function and restores the status of the register to a status of a register of the high-level language function 2.

In other words, after the runtime function 1 returns, the status of the register has been restored to the status of the register of the high-level language function 2, but the runtime function 1 actually jumps to the trampoline function after returning.

S9: The trampoline function obtains the exception parameters transferred by the runtime function 3, and updates the exception parameters to a parameter transfer register.

Because the runtime function 3 stores the exception parameters in the global variable, the trampoline function may obtain, from the global variable, the exception parameters stored in the runtime function 3, and update the exception parameters to the parameter transfer register.

S10: The trampoline function obtains an address of an end position of the high-level language function 2 transferred by the runtime function 3, and jumps to the end position of the high-level language function 2.

Similarly, because the runtime function 3 stores the address of the end position of the high-level language function 2 into the global variable, the trampoline function may obtain, from the global variable, the address of the end position of the high-level language function 2 stored in the runtime function 3, and jump to the address of the end position of the high-level language function 2.

S11: The high-level language function 2 returns, and jumps to the exception catching address.

After the trampoline function jumps to the address of the end position of the high-level language function 2, the high-level language function 2 ends execution and performs returning, thereby restoring the status of the register to a status of a register of the high-level language function 1. In addition, because the return address of the high-level language function 2 is modified to the exception catching address, the high-level language function 2 jumps to the exception catching address when returning.

The exception catching address may be an address of a specified function, where the specified function is a function that is specified in the high-level language function 1 and that is used to process the currently occurring exception. In this way, after the trampoline function jumps to the exception catching address, the specified function continues to perform subsequent exception handling.

For ease of understanding, the following describes the exception handling method provided in embodiments of this application with reference to a coding example.

Refer to the following Java code, where the Java code is high-level language code.

```
Java code:
public class Exception
{
    public static void main(String[ ] args) {
    try {
        //proactively throw a null pointer exception
        throw new NullPointerException( );
    } catch (NullPointerException e) {
        //print after the null pointer exception is caught
        System.out.println("catch");
    }
    }
}
```

Refer to the following assembly code, where the assembly code is code obtained after a compiler compiles the Java code.

```
Assembly code:
LException_3B_7Cmain_7C_28ALjava_2Flang_2FString_3B_29V:
.L.main.1.4:
    xxx
    xxx
    //call an interface for throwing the null pointer exception in runtime
    bl    MCC_ThrowNullPointerException
    normal ret
.L.main.1.1:
    //execute code after the null pointer exception is caught
    bl    MCC_JavaBeginCatch
    xxx
```
```
    //code for clearing a function local reference
    bl    MCC_ClearLocalStackRef
.L.main.1.14:
    xxx;
    xxx.
```

Refer to the following runtime code, where the runtime code is code capable of running in a runtime environment.

```
Runtime code:
//interface for throwing the exception in the runtime
void MCC_ThrowNullPointerException( ) {
    xxx;
    xxx;
}
//interface for catching the exception in the runtime
void MCC_JavaBeginCatch( ) {
    xxx;
    xxx;
}
//interface for clearing the function local reference in the runtime
void MCC_ClearLocalStackRef( ) {
    xxx;
    xxx;
}
```

As shown in the foregoing code, a main method in the Java code is statically compiled and a corresponding assembly function (LException_3B_7Cmain_7C_28ALj_ava_2Flang_2F_String_3B_29V) is generated. bl MCC_xxx in the assembly code indicates that a corresponding function implementation in the runtime is directly called in the code generated by the compiler. For example, bl MCC_ThrowNullPointerException in the assembly code indicates the interface for throwing the null pointer exception in the runtime. When bl MCC_ThrowNullPointerException is executed, the interface for throwing the exception in the runtime (void MCC_ThrowNullPointerException( )) in the runtime code is called.

For the MCC xx functions in the foregoing runtime code, in all calling scenarios of function interfaces that may throw an exception in the runtime, return values of called functions need be checked to determine whether the exception is thrown. If the return value indicates that the exception is thrown, the return value needs to be returned immediately. Runtime functions that may throw the exception also return immediately and transfer exception throwing information to a caller function by using return values.

When the runtime function—interface function for throwing the exception in the runtime (MCC_ThrowNullPointerException), used as a runtime entry function for exception handling, exception handling is started. The interface function for throwing the exception in the runtime calls other functions in the runtime, and all the called runtime functions return normally to restore statuses of registers layer by layer.

In addition, when the interface function for throwing the exception in the runtime (MCC_ThrowNullPointerException) needs to return a Java function (namely, the high-level language function), a return address of the interface function for throwing the exception in the runtime is modified, so that the interface function for throwing the exception in the runtime jumps to the trampoline function during returning. In the trampoline function, the exception parameters obtained during exception handling are updated to the parameter transfer register, and then transferred to a function corresponding to the specified jump address, namely, the function for executing code after the null pointer exception is caught (MCC_JavaBeginCatch) in an example of the foregoing assembly code.

The specified jump address is transferred to the trampoline function, so that the trampoline function finally jumps to the specified jump address in a Java function. As shown in the example of the foregoing assembly code, the specified jump address is an address at a label .L.main.1.1. In other words, the trampoline function jumps to the specified jump address and then the function for executing code after the null pointer exception is caught (bl MCC_JavaBeginCatch) is executed.

To verify effectiveness of the exception handling method provided in embodiments of this application, an embodiment of this application provides a test case for verifying effect. Refer the following test code:

```
public class Exceptiontime
{
    private static long ehStartTime = 0; //start timestamp
    private static long ehEndTime = 0; //end timestamp
    public static void throwException( ) {
        ehStartTime = System.nanoTime( ); //record a timestamp before the exception is thrown
        throw new IllegalStateException( ) //throw the exception
    }
    public static long ehTimeFunc( ) {
        try {
            throwException( );
        } catch(IllegalStateException e) {
            ehEndTime = System.nanoTime( ); //record a timestamp after the exception is caught
        }
        long cost = (ehEndTime - ehStartTime); //calculate a difference between the two
timestamps, namely, time required for exception handling
        return cost;
    }
    public static void main(String[ ] args) {
        int cnt = 30; //handle the exception for 30 times
        long total = 0;
        for(int i = 0; i < cnt; ++i) {
            total += ehTimeFunc( ); //accumulate total time for handling the exception for 30 times
        }
        System.out.println("exception handling total time: "+ total + "ns," + "average "+
total/30 +" ns"); //print average time required per exception handling
    }
}
```

As shown in the foregoing test code, exception handling time consumed by using the exception handling method in the related technology and the exception handling method provided in embodiments of this application are tested in the test case. Thirty times of exception handling are performed in each test, the time spent on each time of exception handling and the total time spent on the thirty times of exception handling are recorded.

Figures 8, 9:
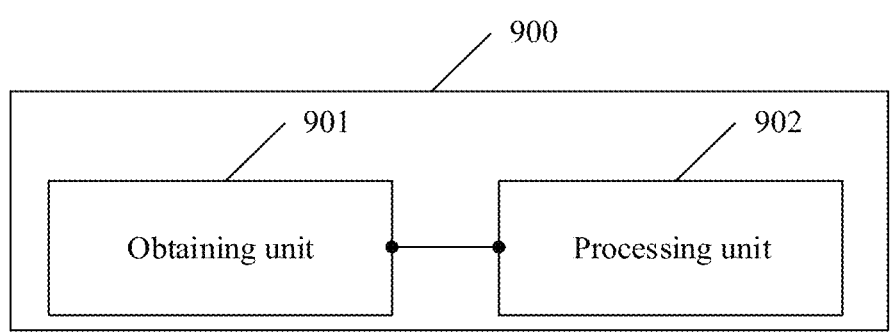
FIG. 8 is a diagram of comparison of consumed test time according to an embodiment of this application.
FIG. 9 is a diagram of a structure of an exception handling apparatus 900 according to an embodiment of this application.

FIG. 8 is a diagram of comparison of consumed test time according to an embodiment of this application. As shown in FIG. 8, when exception handling is performed by using the exception handling method in the related technology (that is, before optimization), an average value of total time consumed by each exception is about 200,000 nanoseconds. When exception handling is performed by using the exception handling method provided in embodiments of this application (that is, after optimization), an average value of total time consumed by each exception is about 140,000 nanoseconds, which is 70% of the average value of the time in the related technology. It can be learned from a test result that the exception handling method provided in embodiments of this application significantly improves exception handling performance.

Based on the embodiments corresponding to FIG. 1 to FIG. 8, to better implement the foregoing solutions in embodiments of this application, the following further provides related devices configured to implement the foregoing solutions.

For details, refer to FIG. 9. FIG. 9 is a diagram of a structure of an exception handling apparatus 900 according to an embodiment of this application. The exception handling apparatus 900 includes an obtaining unit 901 and a processing unit 902. The processing unit 902 is configured to: call a second function according to a call instruction of a first function, where the first function is a high-level language function, and the second function is a runtime function; when an exception occurs in a process of executing the second function, execute a return operation of the second function, where the return operation of the second function includes restoring a status of a first register used when the second function is executed to a status before the first function calls the second function; and perform exception handling based on the status of the first register.

Optionally, in an implementation, the obtaining unit 901 is configured to obtain, from a stack frame, a return address of the second function and a value of the first register stored in the second function. The processing unit 902 is further configured to update, based on the value of the first register, a value in the first register used when the second function is executed. The processing unit 902 is further configured to jump to the return address of the second function.

Optionally, in an implementation, the obtaining unit 901 is further configured to obtain, in the process of executing the second function, a first return value returned by a third function, where the first return value indicates that the exception occurs, and the third function is a function called by the second function.

Optionally, in an implementation, the processing unit 902 is further configured to detect, in the process of executing the second function, that an exception flag bit is set to an abnormal state.

Optionally, in an implementation, the processing unit 902 is further configured to trigger, in the process of executing the second function, the second function to throw the exception.

Optionally, in an implementation, the processing unit 902 is further configured to generate a second return value, where the second return value indicates that the exception occurs. The processing unit 902 is further configured to return the return value to the first function.

Optionally, in an implementation, the processing unit 902 is further configured to set an exception flag bit to an abnormal state.

Optionally, in an implementation, the processing unit 902 is further configured to modify the return address of the second function to an address of a target function, where the target function is used to jump to an exception catching address, and the exception catching address is a specified jump address obtained when the exception occurs.

Optionally, in an implementation, the obtaining unit 901 is further configured to obtain an exception table that matches the exception that occurs when the second function is executed. The obtaining unit 901 is further configured to: obtain the exception catching address in the exception table, and determine the exception catching address as an address jumped to when the target function is executed.

Optionally, in an implementation, the target function is further used to update exception parameters to a register, and the exception parameters are used to perform exception handling after the exception catching address is jumped to.

The exception handling method provided in this embodiment of this application may be performed by a chip in a terminal. The chip includes a processing unit and a communication unit. The processing unit may be, for example, a processor, and the communication unit may be, for example, an input/output interface, a pin, or a circuit. The processing unit may execute computer-executable instructions stored in a storage unit, so that the chip in the terminal performs the exception handling method described in the embodiments shown in FIG. 1 to FIG. 8. Optionally, the storage unit is a storage unit in the chip, for example, a register or a cache. Alternatively, the storage unit may be a storage unit located outside the chip and in a wireless access device for example, a read-only memory (ROM) or another type of static storage device that can store static information and instructions, or a random access memory (RAM).

Figure 10:
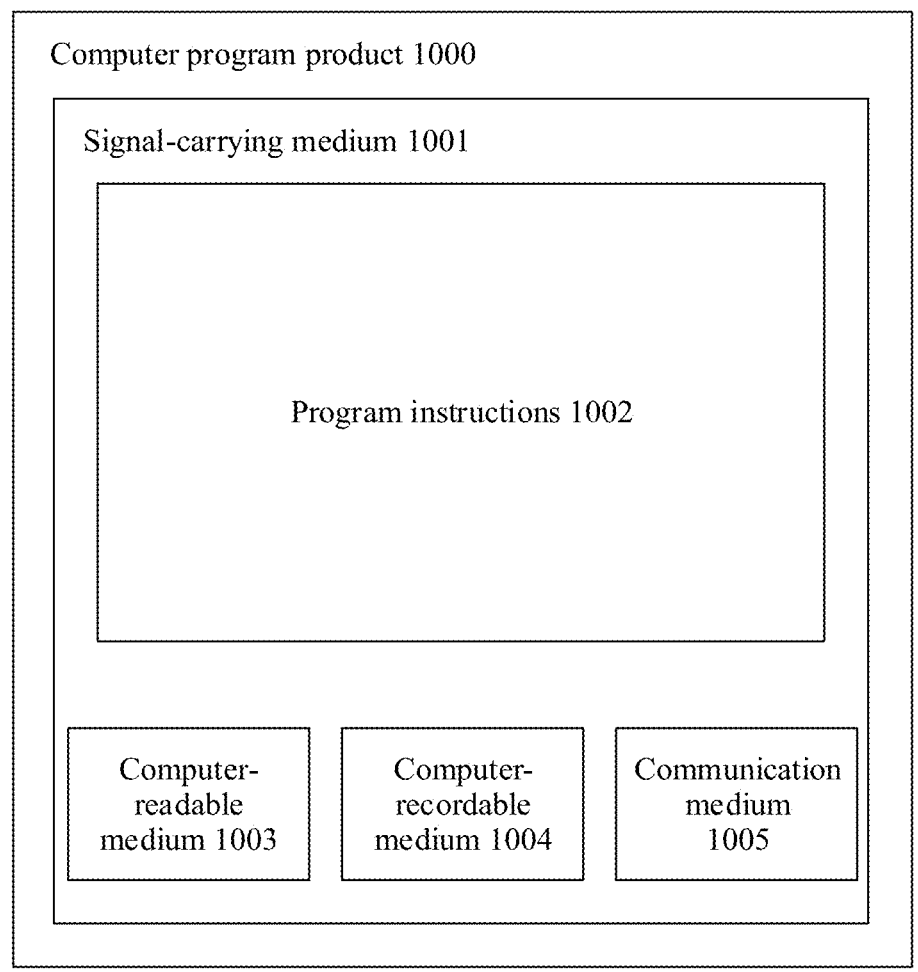
FIG. 10 is a diagram of a structure of a computer program product 1000 according to an embodiment of this application.

Refer to FIG. 10. This application further provides a computer program product. In some embodiments, the method disclosed in FIG. 4 may be implemented as computer program instructions coded in a computer-readable storage medium in a machine-readable format or coded in another non-transitory medium or product.

FIG. 10 illustrates a conceptual partial view of an example computer program product arranged in accordance with at least some embodiments shown herein. The example computer program product includes a computer program for executing a computer process on a computing device.

In one embodiment, the computer program product 1000 is provided by using a signal-carrying medium 1001. The signal-carrying medium 1001 may include one or more program instructions 1002, and when run by one or more processors, the program instructions 1002 may provide the functions or some of the functions described above for FIG. 2. Thus, for example, refer to the embodiment shown in FIG. 3. One or more features of steps 301 to 306 may be undertaken by one or more instructions associated with the signal-carrying medium 1001. In addition, the program instructions 1002 in FIG. 10 also describe example instructions.

In some examples, the signal-carrying medium 1001 may include a computer-readable medium 1003, for example, but not limited to, a hard disk drive, a compact disc (CD), a digital video disc (DVD), a digital magnetic tape, a memory, a ROM, or a RAM.

In some implementations, the signal-carrying medium 1001 may include a computer-recordable medium 1004, for example, but not limited to, a memory, a read/write (R/W) CD, or an R/W DVD. In some implementations, the signal-carrying medium 1001 may include a communication medium 1005, for example, but not limited to, a digital and/or analog communication medium (for example, a fiber optic cable, a waveguide, a wired communication link, or a wireless communication link). Thus, for example, the signal-carrying medium 1001 may be communicated by the communication medium 1005 in a wireless form (for example, a wireless communication medium that complies with the IEEE 802.10 standard or other transmission protocols).

The one or more program instructions 1002 may be, for example, computer-executable instructions or logically implemented instructions. In some examples, the computing device may be configured to provide various operations, functions, or actions in response to the program instructions 1002 that reach the computing device through one or more of the computer-readable medium 1003, the computer-recordable medium 1004, and/or the communication medium 1005.

It should be understood that the arrangement described herein is merely used as an example. Therefore, it may be understood by a person skilled in the art that other arrangements and other elements (for example, machines, interfaces, functions, sequences, and groups of functions) can be used instead, and that some elements may be avoided together based on an expected result. In addition, many of the described elements are functional entities that can be implemented as discrete or distributed components, or implemented in any suitable combination at any suitable position in combination with another component.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory, a random access memory, a magnetic disk, or an optical disc.

What is claimed is:

1. An exception handling method, comprising:
    calling a second function according to a call instruction of a first function, the first function comprising a high-level language function, and the second function comprising a runtime function;
    performing a return operation of the second function when an exception occurs in a process of executing the second function, the return operation of the second function comprises restoring a status of a first register used when the second function is executed to a status before the first function calls the second function; and
    performing exception handling based on the status of the first register.

2. The method according to claim 1, wherein the performing the return operation of the second function comprises:
    obtaining, from a stack frame, a return address of the second function and a value of the first register stored in the second function;
    updating, based on the value of the first register, a value in the first register used when the second function is executed; and
    jumping to the return address.

3. The method according to claim 1 wherein the exception occurs in the process of executing the second function comprises:
    in the process of executing the second function, obtaining a first return value returned by a third function, wherein the first return value indicates that the exception occurs, and the third function is called by the second function.

4. The method according to claim 1, wherein the exception occurs in the process of executing the second function comprises:
    in the process of executing the second function, detecting that an exception flag bit is set to an abnormal state.

5. The method according to claim 1, wherein the exception occurs in the process of executing the second function comprises:
    in the process of executing the second function, throwing the exception by the second function.

6. The method according to claim 5, wherein the performing the return operation of the second function further comprises:
    generating a second return value, wherein the second return value indicates that the exception occurs; and
    returning the return value to the first function.

7. The method according to claim 5, wherein the method further comprises:
    setting an exception flag bit to an abnormal state.

8. The method according to claim 1, wherein before the performing the return operation of the second function, the method further comprises:
    modifying the return address of the second function to an address of a target function, wherein the target function is used to jump to an exception catching address.

9. The method according to claim 8, wherein the target function is further used to update exception parameters to a second register, and the exception parameters are used to perform the exception handling after the exception catching address is jumped to.

10. An exception handling apparatus, comprising:
    a memory storing instructions; and
    at least one processor in communication with the memory, the at least one processor configured, upon execution of the instructions, to perform the following steps:
    calling a second function according to a call instruction of a first function, the first function comprising a high-level language function, and the second function comprising a runtime function;
    performing a return operation of the second function when an exception occurs in a process of executing the second function, the return operation of the second function comprises restoring a status of a first register used when the second function is executed to a status before the first function calls the second function; and
    performing exception handling based on the status of the first register.

11. The exception handling apparatus of claim 10, wherein the performing the return operation of the second function comprises:
    obtaining, from a stack frame, a return address of the second function and a value of the first register stored in the second function;
    updating, based on the value of the first register, a value in the first register used when the second function is executed; and
    jumping to the return address.

12. The exception handling apparatus of claim 10, wherein the exception occurs in the process of executing the second function comprises:
    in the process of executing the second function, obtaining a first return value returned by a third function, wherein the first return value indicates that the exception occurs, and the third function is called by the second function.

13. The exception handling apparatus of claim 10, wherein the exception occurs in the process of executing the second function comprises:
    in the process of executing the second function, detecting that an exception flag bit is set to an abnormal state.

14. The exception handling apparatus of claim 10, wherein the exception occurs in the process of executing the second function comprises:
    in the process of executing the second function, throwing the exception by the second function.

15. The exception handling apparatus of claim 14, wherein the performing the return operation of the second function further comprises:
    generating a second return value, wherein the second return value indicates that the exception occurs; and
    returning the return value to the first function.

16. The exception handling apparatus of claim 14, wherein the method further comprises:
    setting an exception flag bit to an abnormal state.

17. The exception handling apparatus of claim 10, wherein before the performing the return operation of the second function, the method further comprises:

modifying the return address of the second function to an address of a target function, wherein the target function is used to jump to an exception catching address.

18. The exception handling apparatus of claim 17, wherein the target function is further used to update exception parameters to a second register, and the exception parameters are used to perform the exception handling after the exception catching address is jumped to.

19. A non-transitory computer-readable media storing computer instructions that configure at least one processor, upon execution of the instructions, to perform the following steps:

calling a second function according to a call instruction of a first function, the first function comprising a high-level language function, and the second function comprising a runtime function;

performing a return operation of the second function when an exception occurs in a process of executing the second function, the return operation of the second function comprises restoring a status of a first register used when the second function is executed to a status before the first function calls the second function; and performing exception handling based on the status of the first register.

20. The computer-readable media of claim 19, wherein the performing the return operation of the second function comprises:

obtaining, from a stack frame, a return address of the second function and a value of the first register stored in the second function;

updating, based on the value of the first register, a value in the first register used when the second function is executed; and jumping to the return address.

* * * * *